United States Patent [19]

Osswald et al.

[11] 4,105,464

[45] Aug. 8, 1978

[54] PROCESS FOR THE PRODUCTION OF PIGMENT-SYNTHETIC RESIN CONCENTRATES

[75] Inventors: GFünter Osswald, Hanau; Hans Gräf, Rodenbach, both of Germany

[73] Assignee: Deutsche Gold- und Silber-Scheideanstalt vormals Roessler, Frankfurt, Germany

[21] Appl. No.: 592,861

[22] Filed: Jul. 3, 1975

[30] Foreign Application Priority Data

Jul. 12, 1974 [DE] Fed. Rep. of Germany ....... 2433562

[51] Int. Cl.² ............................................. C08K 3/04
[52] U.S. Cl. ............................... 106/307; 106/308 M; 106/309; 260/28.5 A; 260/42.14; 260/42.43; 260/42.46; 260/42.49; 260/42.52; 260/42.55; 260/42.56
[58] Field of Search .......................... 260/42.55, 42.14; 106/307, 308 M, 309

[56] References Cited

U.S. PATENT DOCUMENTS

| | | | |
|---|---|---|---|
| 3,122,518 | 2/1964 | Logemann et al. | 260/42.55 |
| 3,392,140 | 7/1968 | Maahs et al. | 260/42.55 |
| 3,462,390 | 8/1969 | Dunn | 260/42.55 |
| 3,637,571 | 1/1972 | Polovina | 260/42.55 |
| 3,755,244 | 8/1973 | Hart | 260/42.55 |
| 3,898,189 | 8/1975 | Bonnaud | 260/42.55 |

FOREIGN PATENT DOCUMENTS

| | | | |
|---|---|---|---|
| 4,736,010 | 1972 | Japan | 260/42.55 |
| 936,911 | 9/1963 | United Kingdom. | |
| 1,072,983 | 6/1967 | United Kingdom | 260/42.55 |
| 281,455 | 12/1963 | United Kingdom | 260/42.55 |

*Primary Examiner*—James H. Derrington
*Attorney, Agent, or Firm*—Cushman, Darby & Cushman

[57] ABSTRACT

Carbon black containing pigment-synthetic resin concentrates are prepared by intensive intimate mixing of an aqueous polymerizate-lyosol containing a dispersed pigment and coagulating by addition of an electrolyte, separating the coagulate from the aqueous phase and drying.

36 Claims, No Drawings

PROCESS FOR THE PRODUCTION OF PIGMENT-SYNTHETIC RESIN CONCENTRATES

The invention is directed to a process for the production of carbon black containing pigment-synthetic resin concentrates.

Carbon black containing pigment-synthetic resin concentrates are used for the pigmentation of binders, for example in the production of paints, enamels, molded parts, cast parts, films, etc., whereby because of their favorable ratios between pigment content and volume there can be saved, for example, substantial storage and transportation costs.

It is known for example that carbon black-synthetic resin concentrates containing carbon black and polymer can be produced in the form of so-called granulates by intermixing the carbon black into the polymer with the help of roll mills, kneaders or similar massive dispersing machines and subsequently conveyed by an extruder to a chopping maching which granulates the plastic material.

The disadvantage of this process is that the bead shaped color blacks can only be unsatisfactorily dispersed because at the high temperatures in the kneader the viscosity of the polymer is reduced so much that the shearing strength is no longer sufficient to break up the carbon black beads in the relatively short time and to obtain a satisfactory dispersion of the carbon black. By increasing the kneading time at the high temperatures there is the danger the polymer decomposes. If there are employed polymers with higher melt viscosity there are obtained carbon black-synthetic resin concentrate which, however, are very hard and can only be partially broken up in the processing, as for example in coloring polyethylene (PE) films in a bubble film extruder and therefore tend to form spots.

The invention is based on the problem of developing a process for the production of carbon black containing pigment-synthetic resin concentrates which guarantees a satisfactory and complete dispersion of the pigment and a spot free breaking up of the pigment-synthetic resin concentrate in the processing. This problem was solved according to the invention by a process which is characterized by bringing a dispersed pigment containing aqueous polymerizate lyophilic sol(lyosol) under intensive intimate mixing to coagulation by addition of an electrolyte, separating the coagulate from the aqueous phase and drying the coagulate.

The coagulation can be effected according to the invention by shifting the pH value of the aqueous lyosol and thereby render the lyosol unstable. According to the pH of the lyosol there can be added acid or alkaline reacting electrolytes. Thus alkaline reacting lyosols can be treated with acid reacting electrolytes and acid reacting lyosols can be treated with alkaline reacting electrolytes. Thus according to the properties of the lyosol there can be used acid or basic salts as well as acids or bases, as for example HCl or sodium silicate (water glass) solution. Other typical examples of acidic materials are HBr, $HNO_3$, sulfuric acid, phosphoric acid,[*] ammonium chloride and ammonium sulfate. Additional typical examples of basic materials are sodium hydroxide, potassium hydroxide, potassium silicate, sodium carbonate[**] and potassium carbonate. The specific acidic or basic material is not critical.

[*] formic acid, acetic acid, toluene-sulfonic acid, oxalic acid
[**] $NH_3$, $NaO_2C-CH_3$ The optimum amount of coagulation agent to use can be ascertained in individual cases by testing. In the addition of the respectively suitable electrolytes the reagent can be followed by a pH meter until the neutral point is reached or exceeded.

Preferably the electrolytes can be added to the lyosol in dilute aqueous solution which contains a maximum of 25 weight %, more preferably 10 weight %, of the electrolyte with intensive mixing. The electrolyte can be as little as 0,5% by weight. For the intensive mixing there can be used high speed stirrers, as for example, a dissolver. This intimate mixing makes certain a uniformly structured coagulate in which the added electrolyte solution acts uniformly on every part of the lyosol and thus prevents the formation of variable coarse aggregates of the coagulate.

The coagulate is separated from the aqueous phase by known procedures, as for example filtration with a filter press, washed until neutral with water and dried at elevated temperature between 30° and 50° C., preferably between 35° and 45° C., for example at 40° C. in a vacuum.

To produce pigment synthetic resin concentrates according to the invention there can be used lyosol organic materials in water. Preferably there can be used, employing known emulsifying systems, polyethylene with an average molecular weight of 12,000 to 22,000, preferably 16,000 to 20,000, polyethylene waxes or ethylene-vinyl acetate copolymers wherein the content of the polymerizate in the aqueous lyosol is 10 to 60 weight %, preferably 15 to 55 weight %. Other suitable polymers include polyvinylchloride, polystyrene.

The amount of pigment based on the weight of the pigmented lyosol is 2 to 15%, preferably 3 to 12% or the portion of pigment for example carbon blacks of the classes HCC (High Color Channel), RCC (Regular Color Channel), MCC (Medium Color Channel), LFI (Long Flow Impingement), FCFm (Fine Color Furnace modified), FCF (Fine color Furnace) or MCF (Medium Color Furnace) amounts to 10 to 60%, preferably 15 to 55%, based on the weight of the dried pigment-synthetic resin concentrate.

Also the subject of the invention is a pigment-synthetic resin concentrate obtainable by the process of the invention. This can be used for example for working into synthetic resin films in which the concentration of the pigment in the product is 0.4 to 2 weight %, preferably 0.5 to 1.5 weight %. Thus the concentrate can be employed to provide pigment for films of polyethylene, polypropylene, polystyrene, polyvinylchloride.

An especial advantage of the process of the invention is that carbon blacks which can scarcely give satisfactory results in the production of carbon black-synthetic resin concentrates according to the known state of the art can be employed. They are marked by a very good degree of dispersion in the process of the invention and make possible in the pigmentation of synthetic resins or their intermediates an optimum distribution of the pigment in a short time in producing end products. As can be seen from the above, there are normally employed thermoplastic synthetic resins in the invention.

Unless otherwise indicated, all parts and percentages are by weight.

Preferred processes within the invention are further explained through the following examples:

I. PRODUCTION OF CARBON BLACK-SYNTHETIC RESIN PREPARATIONS

EXAMPLE 1 (according to the state of the art)

| | |
|---|---|
| Polyethylene wax (PAD 521) | 75 grams |
| Color black FW18 (Farbruss FW 18) | 25 grams |
| | 100 grams |

The components were kneaded at 140°–150° C. for about 15 minutes until complete dispersion. Subsequently the product was discharged by way of an extruder and granulated.

The polyethylene-wax PAD 521 used was a polyethylene wax having the following properties:

| | | |
|---|---|---|
| Dropping point | DGF*)-M-III 3 (57) | 98 – 102° C. |
| Solidification point | DGF-M-III 4a(63) | 86 – 90° C. |
| Acid number | DGF-M-IV 2 (57) | 14 – 18 |
| Saponification no. | DGF-M-IV 2 (57) | 20 – 35 |
| Density | DGF-M-III 2a(57) | 0.93 – 0.95 |
| Penetration no. | 100g/25° C./5sec. | 4 – 6 |
| Color | | almost white |

The polyethylene wax is produced by Hochst.
*) "DGF-Einheitsmethoden" to be obtained by Wissenschaftliche Verlagsgesellschaft mbH., Stuttgart-N., Birkenwaldstr.44

The Farbruss FW18 (Carbon Black FW 18) has the following properties:

| | |
|---|---|
| Oil demand (flow point) | 800% (g/100g) |
| Tamped density | 0.13 g/ml |
| pH Value | 5 |
| Surface area | 260 m²/g |
| Average particle size | 15 mμ |

It belongs to Class HCC II (High Color Channel).

EXAMPLE 2 (according to the state of the art)

| | |
|---|---|
| Polyethylene wax (PAD 521) | 75 grams |
| Printex 140V (Carbon black) | 25 grams |
| | 100 grams |

The components were worked as described in Example 1. The polyethylene wax used has the properties described in Example 1.

The carbon black Printex 140V has the following properties:

| | |
|---|---|
| Oil demand (flow point) | 360% (g/100g) |
| Tamped density | 0.16 g/ml |
| pH value | 5 |
| Surface area | 96 m²/g |
| Average particle size | 29 mμ |

It belongs to the class RCC (Regular Color Channel).

EXAMPLE 3 (according to the state of the art)

| | |
|---|---|
| Polyethylene wax (PAD 521) | 75 grams |
| Printex V (carbon black) | 25 grams |
| | 100 grams |

The components were worked as described in Example 1. The polyethylene wax used had the properties described in Example 1.

The carbon black Printex V used had the following properties:

| | |
|---|---|
| Oil demand (flow point) | 400% (g/100g) |
| Tamped density | 0.16 g/ml |
| pH value | 5 |
| Surface area | 96 m²/g |
| Average particle size | 25 mμ |

It belongs to the class RCC (Regular Color Channel).

EXAMPLE 4 (according to the state of the art)

| | |
|---|---|
| Polyethylene wax (PAD 521) | 75 grams |
| Printex 200 carbon black | 25 grams |
| | 100 grams |

The components were worked as described in Example 1. The polyethylene wax used had the properties described in Example 1.

The carbon black Printex 200 used had the following properties:

| | |
|---|---|
| Oil demand (flow point) | 210% (g/100g) |
| Tamped density | 450 g/l = (0.45 g/ml) |
| pH value | 9 |
| Surface area | 43 m²/g |
| Average particle size | 56 mμ |

It belongs to the class MCF (Medium Color Furnace).

EXAMPLE 5 (according to the invention)

(a) Production of the lyosol

| | |
|---|---|
| Polyethylene wax (PAD 521) | 17.0 g |
| Olein | 2.3 g |
| Morpholine | 5.5 g |
| NaOH | 0.2 g |
| Water | 75.0 g |
| | 100.0 g. |

Morpholine and NaOH were stirred into the heat wax-olein-melt. Subsequently the mixture was stirred into boiling water. After the end of the emulsification the mixture was cooled to room temperature.

The polyethylene wax PAD 521 used had the properties given in Example 1.

The emulsion system is ionogenic.

(b) Production of the carbon black-synthetic resin concentrate

| | |
|---|---|
| Lyosol prepared according to Example 5(a) | 800 g |
| Color Black FW 18 | 34 g |
| | 834 g |

This mixture was dispersed for 48 hours in a ball mill. Subsequently the lyosol was brought to coagulation with about 40 ml of 2N HCl with stirring in a Dissolver (a high speed stirred vessel). Determinative of the amount of electrolyte added is the reaching or exceeding of the neutral point which was controlled with the help of a pH meter. The coagulate was washed with water until neutral and dried at 40° C. in a vacuum to constant weight.

The carbon black used had the properties given in Example 1.

EXAMPLE 6 (according to the invention)

(a) Production of the lyosol

The lyosol was prepared from the same ingredients and using the same process as described in Example 5a.

(b) Production of the carbon black-synthetic resin concentrate

| | |
|---|---|
| Lyosol prepared according to example 5(a) | 800 g |
| Printex 140V = carbon black | 34 g |
| | 834 g |

The mixture was worked as described in Example 5(b).

The carbon black used had the properties given in Example 2.

EXAMPLE 7 (according to the invention (a) Production of the lyosol

The lyosol was prepared from the same ingredients and according to the same process as described in Example 5(a).

(b) Production of the carbon black-synthetic resin concentrate

| | |
|---|---|
| Lyosol prepared according to Example 5(a) | 800 g. |
| Printex V-carbon black | 34 g |
| | 834 g. |

The mixture was worked as described in Example 5(b).

The carbon black used had the properties given in Example 3.

EXAMPLE 8 (according to the invention)

(a) Production of the lyosol

The lyosol was prepared from the same ingredients and according to the same process as described in Example 5(a).

(b) Production of the carbon black-synthetic resin concentrate.

| | |
|---|---|
| Lyosol prepared according to Example 5(a) | 800 g |
| Printex 200-carbon black | 34 g |
| | 834 g |

The mixture was worked as described in Example 5(b).

The carbon black used had the properties given in Example 4.

EXAMPLE 9 (according to the invention)

| | |
|---|---|
| Staprint DFPG-947N (polyethylene wax-lyosol) of Hendricks & Sommer Kunstharze KG | 400 g |
| Printex 140V-carbon black | 32 g |
| Water | 100 g |
| | 532 g |

These materials were worked as described in Example 5(b) whereby about 45 ml of 2N HCl were added in carrying out the coagulation. The carbon black Printex 140V used had the properties given in Example 2. The polyethylene wax-lyosol Staprint DFPG-947N has the following properties:

Finely dispersed, aqueous, non-ionogenic dispersion based on an oxidized polyethylene wax

| | |
|---|---|
| Solids | 32 ± 1% |
| pH value | 9.5 – 10.5 |
| Specific gravity at 25° C. | 0.98 kg/dm$^3$ |
| Viscosity at 25° C. | below 200 cps |
| Emulsifying system | nonionic |

EXAMPLE 10 (according to the invention)

| | |
|---|---|
| Staprint DFPG-901 AN(polyethylene wax-lyosol) of Hendricks & Sommer Kunstharze KG | 400 g. |
| Printex 140V-carbon black | 32 g. |
| Water | 100 g. |
| | 532 g. |

These materials were worked as described in Example 5(b) whereby about 45 ml of 2NHCl were added (up to the neutral point) in carrying out the coagulation. The carbon black used, Printex 140V, had the properties given in Example 2. The polyethylene wax lyosol used had the following properties:

Finely dispersed, aqueous anionic-nonionic dispersion based on an oxidized polyethylene wax

| | |
|---|---|
| Solids | 32 ± 1% |
| pH value | 9.2 – 10.0 |
| Specific gravity at 25° C. | 0.98 kg/dm$^3$ |
| Viscosity | below 1000 cps |
| Emulsifying system | anionic-nonionic |

EXAMPLE 11 (according to the invention)

| | |
|---|---|
| LT-411 copolymerizate | 200 g |
| Printex 140V-carbon black | 17 g |
| Water | 50 g |
| | 267 g |

The materials were dispersed with cooling for 30 minutes with an Ultra Turrax mixer. The subsequent coagulation of the lyosol took place by addition of about 30 ml of a 10% sodium silicate (water glass) solution with control of the neutral point by a pH meter. After the filtration the coagulate was washed with water until neutral and dried at 40° C. in vacuum to constant weight.

The carbon black, Printex 140V, used had the properties given in Example 2.

The lyosol LT-411 used had the following properties:

| | |
|---|---|
| Aqueous dispersion of a copolymerizate solids content | 43% |
| Polyethylene contents of the solids | 40% |
| Polyvinyl acetate content of the solids | 60% |

The LT-411 is produced by Wacker-Chemie GmbH in Munich.

EXAMPLE 12 (according to the invention)

| | |
|---|---|
| Lyosol Hordamer ® PE 01 | 200 g |

-continued

| | |
|---|---|
| Printex ® 140V | 43 g |
| Water | 150 g |
| | 393 g |

These materials were dispersed in an Attritor mixer for 45 minutes. Subsequently the lyosol was brought to coagulation with 40 ml of 2N HCl. After the filtration the coagulate was washed with water to the neutral point and dried at 40° C. in a vacuum to constant weight.

The carbon black Printex ® 140V used had the properties given in Example 2.

The lyosol Hordamer ® PE 01 used had the following properties:

| | |
|---|---|
| Solids content | 40 ± 1% |
| pH value | 9.5 – 11 |
| Viscosity at 25° C. (c87) (Ubbelohde Capillary Viscosimeter | <50 |
| Density at 20° C. | 0.96 – 0.98 |
| Average molecular weight of the solids (according to viscosity measurements) | 16,000–20,000 |

EXAMPLE 13 (according to the invention)

| | |
|---|---|
| Printex 200 | 80 g |
| Poligen PE 01 of BASF AG | 200 g |
| Water | 100 g |
| | 380 g |

These materials were worked as described in Example 12. The carbon black, Printex 200, used had the properties given in Example 4. The Poligen PE used has the same properties as the lyosol used in Example 12.

II. USE OF THE PIGMENT-SYNTHETIC RESIN CONCENTRATE

EXAMPLE 14 (according to the invention)

The dried pigment-synthetic resin concentrate according to example 12 was diluted to a carbon black content of 1% by simple hand mixing with polyethylene (LUPOLEN ® 2430H) granulates and worked to black colored polyethylene films with a bubble film extruder.

The evaluation of the preparation took place by a visual inspection of the colored tubular film in regard to spot formation and carbon black distribution.

No spot formation was observed.

The carbon black distribution was very good.

The LUPOLEN ® 2430OH used had the following properties:

| | |
|---|---|
| Density at 23° C. (DIN 53479) | 0.923 – 0.925 g/cm² after one hour tempering |
| Melt index MFI 190/2.16 (DIN 53735) | 1.6 – 2.2 g/10min |
| Yield Stress (DIN 53455) | 110 – 220 kp/cm² |
| Shear modulus (DIN 53445) | 2600 kp/cm² |
| Ball pressure hardness $H_{A\,10}$ (DIN 53 456) | 210 kp/cm² |
| Ball pressure hardness $H_{A\,60}$ (DIN 53456) | 180 kp/cm² |

III. EVALUATION

When the pigment-synthetic resin concentrates of Examples 1, 2, 3 and 4 of the state of the art were used for the production of a polyethylene film according to Example 14 they showed a strong formation of spots and a poor carbon black distribution.

On the contrary when the pigment-synthetic resin concentrates of the invention of examples 5, 6, 7, 8, 9, 10, 11, 12 and 13 were used for the production of a polyethylene film according to example 14 they showed very good carbon black distribution without spot formation.

In addition to incorporation in polyethylene film the concentrate can be incorporated in films of other polymers, e.g., olefin polymers such as polypropylene, ethylene-propylene copolymer and polybutylene, polystyrene, polyvinyl chloride and other vinyl chloride polymers, etc.

We claim:

1. A process for the production of a carbon black containing pigment-synthetic resin concentrate comprising coagulating an aqueous polyethylene lyophilic sol containing dispersed carbon black pigment, said lyophilic sol being either (a) alkaline or (b) acid, said coagulation being carried out with intensive mixing by an addition of an electrolyte which shifts the pH, said electrolyte being acid reacting when said sol is alkaline and said electrolyte being alkaline reacting when said sol is acid, separating the coagulate from the aqueous phase and drying the coagulate.

2. A process according to claim 1 wherein the lyophilic sol is alkaline and is treated with an acid reacting electrolyte.

3. A process according to claim 1 wherein the lyophilic sol is acid and is treated with an alkaline reacting electrolyte.

4. A process according to claim 1 wherein the coagulation is carried out with a dilute aqueous electrolyte solution having a concentration not over 25%.

5. A process according to claim 4 wherein the electrolyte concentration is 10%.

6. A process according to claim 1 wherein the drying is carried out at 30° to 50° C. in a vacuum.

7. A process according to claim 6 wherein the drying temperature is between 35° and 45° C.

8. A process according to claim 1 wherein the average molecular weight of the polyethylene is 12,000 to 22,000.

9. A process according to claim 8 wherein the polyethylene has a molecular weight of 16,000 to 20,000.

10. A process according to claim 1 wherein the coagulate is washed with water until neutral.

11. A process according to claim 1 wherein there is used an aqueous lyophilic sol of a polyethylene wax.

12. A process according to claim 1 wherein the polyethylene is 10 to 60% of the aqueous lyophilic sol by weight.

13. A process according to claim 12 wherein the polyethylene is 15 to 55% of the aqueous lyophilic sol by weight.

14. A process according to claim 1 wherein the carbon black is a regular color channel black.

15. A process according to claim 1 wherein the carbon black is a medium color channel black.

16. A process according to claim 1 wherein the carbon black is a high color channel black.

17. A process according to claim 1 wherein the carbon black is a long flow impingement black.

18. A process according to claim 1 wherein the carbon black is a modified fine color furnace black.

19. A process according to claim 1 wherein the carbon black is a fine color furnace black.

20. A process according to claim 1 wherein the carbon black is a medium color furnace black.

21. A process according to claim 1 wherein after separating the coagulate it is dried by elevating the temperature to between 30° and 50° C.

22. A process according to claim 1 wherein the coagulation is carried out at room temperature.

23. A process according to claim 1 wherein the coagulation is carried out with a dilute aqueous electrolyte solution having a concentration of 0.5 to 25%.

24. A process according to claim 21 wherein the electrolyte solution has a concentration of 0.5 to 10%.

25. A process for the production of a carbon black containing pigment-synthetic resin concentrate comprising coagulating an aqueous polyethylene or ethylene-vinyl acetate copolymer lyophilic sol containing dispersed carbon black pigment, said lyophilic sol being acid, said coagulation being carried out with intensive mixing by an addition of an electrolyte which shifts the pH to the alkaline side separating the coagulate from the aqueous phase and drying the coagulate.

26. A process according to claim 25 wherein the coagulation is carried out with a dilute aqueous electrolyte solution having a concentration not over 25%.

27. A process according to claim 26 wherein the electrolyte concentration is 10%.

28. A process according to claim 25 wherein there is used a polyethylene lyophilic sol.

29. A process according to claim 28 wherein the average molecular weight of the polyethylene is 12,000 to 22,000.

30. A process according to claim 25 wherein the coagulate is washed with water until neutral.

31. A process according to claim 25 wherein there is used an aqueous lyophilic sol of a polyethylene wax.

32. A process according to claim 25 wherein there is used an aqueous lyophilic sol of an ethylene-vinyl acetate copolymer.

33. A process according to claim 25 wherein the polymerizate is 10 to 60% of the aqueous lyophilic sol by weight.

34. A process according to claim 25 wherein after separating the coagulate it is dried by elevating the temperature to between 30° and 50° C.

35. A process according to claim 25 wherein the coagulation is carried out at room temperature.

36. A process according to claim 25 wherein the electrolyte solution has a concentration of 0.5 to 10%.

* * * * *